Figure 1:
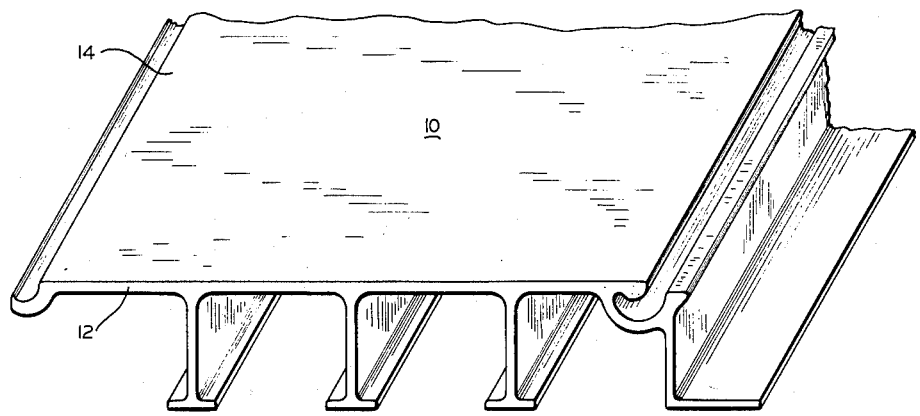

Aug. 3, 1965 T. C. BROWN 3,197,934
JOINT FOR METAL FLOOR SECTIONS AND THE LIKE
Filed April 10, 1962 2 Sheets-Sheet 1

INVENTOR
THOBURN C. BROWN
BY
*Kenneth C. Witt*
ATTORNEY

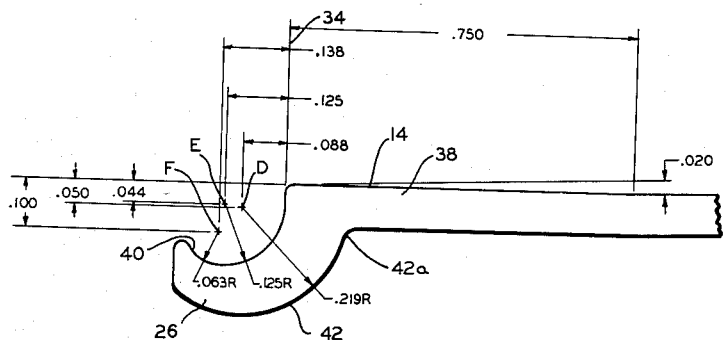
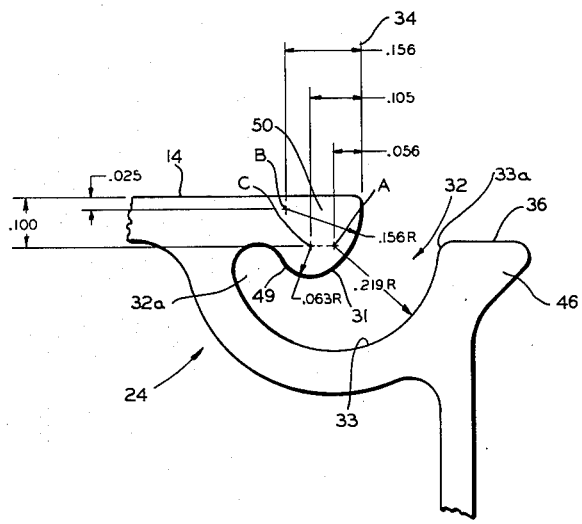

United States Patent Office 3,197,934
Patented Aug. 3, 1965

3,197,934
JOINT FOR METAL FLOOR SECTIONS AND THE LIKE
Thoburn C. Brown, Lake Forest, Ill., assignor to Clark Equipment Company, a corporation of Michigan
Filed Apr. 10, 1962, Ser. No. 186,375
1 Claim. (Cl. 52—595)

This invention relates to metal floors and more particularly to a joint for a metal floor which may be utilized in joining a plurality of sections to form a unitary floor structure. This invention is particularly useful in trucks, trailers, railway cars and the like which must carry heavy loads and in which the floors must be suitable for loading and unloading by fork trucks and other material handling machines, but it is adaptable for other installations as well.

The floor of a vehicle such as those mentioned should have several important characteristics. The floor surface should be smooth and free from projections so that freight may be slid along the floor during loading and unloading operations if desired. Likewise, it should be free from depressions in which dirt and moisture may accumulate. The floor surface should be level, solid and wear resistant. Such a floor also should be of a construction such that it can be readily assembled from easily handled sections. It should be possible to remove and replace such sections without difficulty. At the same time, the sections, when secured together, should form a unitary, rigid floor structure in which the joints will not separate even under the concentrated loading caused by the wheels of loaded fork trucks operating on the floor.

The object of the present invention is to provide a metal floor section joint which fulfills all of the foregoing requirements, and at the same time is readily producible at reasonable cost by known processes and techniques.

In carrying out this invention in one preferred form thereof I provide an extruded metal floor section, commonly of aluminum, which has a rectangular horizontal portion having an upper flat surface thereon, with a plurality of longitudinally extending rib or flange members depending from the horizontal portion. This section is arranged to be joined to other identical sections on each side. The section has female connection means along one longitudinal edge and male connection means along the other parallel longitudinal edge. The female and male connection means are of such configuration that they have two areas of contact, whereby it is possible readily to join floor sections according to this invention, and once they have been joined and are disposed horizontally as the floor of a vehicle it is not possible then to pull two adjacent sections apart or even for them to separate slightly to permit the opening of a crack between them.

Figure 2:
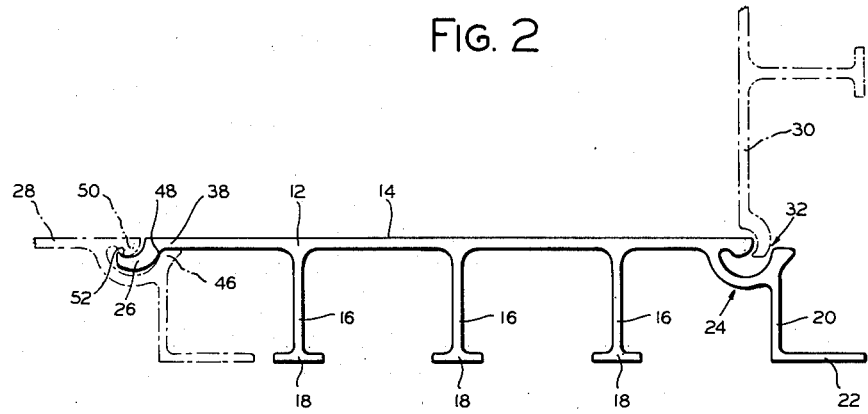

For a clearer and more complete understanding of my invention reference should be had to the accompanying drawing in which:

FIGURE 1 shows an isometric view of a portion of a floor section according to the present invention, FIGURE 2 shows a transverse profile view of the floor section of FIG. 1 with portions of adjacent sections shown in phantom to show the manner of connection, FIGURE 3 is an enlarged fragmentary view of the male portion of the connection means of this invention, and FIGURE 4 shows an enlarged fragmentary view of the female portion of the connection means.

Referring to the drawing, there is shown in FIG. 1 a portion of a floor section according to this invention which is identified generally by the numeral 10. The floor section 10 includes a horizontal portion indicated by the numeral 12 which has a flat upper surface 14. Depending from portion 12 are a plurality of longitudinally extending ribs or support elements. As shown three of these indicated by the numeral 16 are of inverted T-shape having an enlarged portion 18 at the bottom to support this floor section on a suitable sub-floor structure. The fourth support element, which is indicated by the identifying numeral 20, is along the right side of the floor section and is L-shaped in profile, having a horizontally extending portion 22 at the bottom adapted to rest on the sub-floor.

As shown, floor section 10 has female connection means indicated generally by the numeral 24 along the right edge and male connection means indicated generally by the numeral 26 along the left edge of the floor section. FIG. 2 shows in dashed lines along the left the manner in which this section is interlocked with an adjacent section 28 to provide a unitary floor structure and one which provides the advantages of a smooth, level floor having joints which will not separate even under concentrated loads. At the right of FIG. 2 is illustrated in dashed lines the manner in which another floor section the same as the present one is assembled with this floor section in order to provide a portion of a complete floor for a vehicle. It will be readily appreciated that as the additional floor section 30 is rotated clockwise from the phantom position shown in FIG. 2 the connection between the two floor sections is easily made, and ultimately the section 30 comes to rest in a horizontal position alongside section 10. When such position is reached the connection between the two sections has been completed and is then the same as is shown along the left side of FIG. 2. While only floor sections are described and illustrated herein, it will be readily appreciated by those skilled in the art that it is possible by using the same connection means disclosed herein to join other members to the floor sections to provide for the vertical wall surfaces of the vehicle.

FIGS. 3 and 4 show the male and female connection portions of the floor section in greater detail. Referring first to FIG. 4, it will be seen that the female connection portion 24 there illustrated includes an opening 32 which extends downwardly and inwardly near the right edge of the floor section and has a reentrant portion 32a extending part way back up to the upper horizontal surface 14 of the floor section. In order to make the present invention fully understandable certain important dimensions have been shown in FIGS. 3 and 4 for a typical floor section embodying this invention. This typical section has an overall width as seen in FIG. 2 of 6.301 inches, this width including the horizontal projection 22, and an overall height of 1.062 inches.

As shown in FIG. 4, both the upper and lower surfaces 31 and 33 respectively, of opening 32 are arcuate in configuration. In this typical example the lower surface 33 has a radius of .219 inch about the point A the location of which is provided by the other dimensions in FIG. 4 all of which are in inches. It should be noted that plane 34 provides a common reference between the structures of FIGS. 3 and 4. The upper surface 31 follows two radii, one of .156 inch about the point B and the other .063 inch about the point C. The locations of center points B and C also are indicated with reference to surface 14 and reference plane 34, all dimensions being shown in inches. The upper surface 36 of the outer edge portion 46 of the floor section is below surface 14 by the thickness of part 38 (see FIG. 3) of the horizontal portion of the floor section so that when two sections are assembled together the upper surfaces thereof provide a flat floor.

The upper and lower surfaces, 40 and 42 respectively of projection 26, which is illustrated in an enlarged view in FIG. 3, also are arcuate in configuration. The lower surface 42 has the same radius as the lower surface 33 of opening 32, that is, .219 inch, although the center point D of this radius is at a slightly greater distance from the reference plane 34 than center A in FIG. 4, and closer to surface 14. The upper surface 40 of projection 26 has two radii, one being .125 inch about point E and the other .063 inch about point F. The latter radius is the same as the radius of the corresponding portion 49 of the upper surface 31 of opening 32; however the point F is located somewhat farther from the reference plane than point C in FIG. 4; both C and F are the same distance from surface 14. Center points D, E and F are located in FIG. 3 with respect to reference plane 34 and upper surface 14, all dimensions in FIG. 3 likewise being in inches.

FIG. 3 illustrates in exaggerated fashion that the left side of the floor section 10 when it is extruded is formed with a slight rise as compared to the upper flat surface of the remainder of the extrusion. In this particular case the rise is approximately .020 inch for the extreme .750 inch at the left of the upper surface as illustrated. It will be appreciated that when the floor section is finally assembled as a portion of a complete floor that the portion 38 of the section will flex downwardly sufficiently that the entire upper surface 14 of the floor section will lie in the same plane. The purpose of the said slight rise is to assure that the foot portions 18 abut solidly against the substructure when the floor sections are assembled in final position on the substructure.

When two sections are assembled together, the upper end 42a of lower surface 42 of the projection 26 abuts the upper end 33a of lower surface 33 on portion 46 of the connected floor section, at location 48 as indicated in FIG. 2. At the same time the upper arcuate surface 40 of the projection 26 abuts the arcuate portion 49 of the downwardly projecting portion of lip 50 at location 52 as seen in FIG. 2; as mentioned previously arcuate portion 49 is a part of the upper curved surface 31 of the opening 32. This provides a positive connection which makes it impossible for the floor sections to move laterally away from one another as long as there is no deformation in the metal of which the floor sections are made. Also, the part 38 of floor section 10 rests on portion 46 of the connected section to prevent any downward deflection of this cantilever portion of the floor section.

While assembly of connecting floor sections as shown provides a joint which is quite effective in resisting the passage of liquids, it is possible if desired when the joints are made to insert into opening 32 before the mating member is inserted a suitable mastic to provide a completely watertight joint.

It will be apparent from the foregoing description taken in conjunction with the drawing that this invention fulfills the objects set forth initially and provides a very advantageous structure for use as the floor of trucks, trailers, railroad cars and the like. At the same time, however, the structure may be readily disassembled in order to replace any section or sections which may have been damaged in any manner. Such disassembly is carried out by the reverse of the procedure described hereinbefore and illustrated in FIG. 2.

While a preferred form of the invention has been described and illustrated herein in accordance with the patent statutes, it will be appreciated by those skilled in the art that modifications may be made. It should be understood therefore that I intend to cover by the appended claim all such modifications which fall within the true spirit and scope of this invention.

I claim:

For use in connecting first and second elongated members each having a horizontal portion of approximately uniform thickness with a flat upper surface and a plurality of longitudinally extending ribs projecting downwardly from the horizontal portion adapted to rest on a supporting surface, a joint comprising a continuously inwardly tapered, downwardly, inwardly and upwardly curved opening with its entrance along one edge of the horizontal portion of the first member and which opening in transverse profile extends from the said entrance downwardly and inwardly of the first member and has a re-entrant portion extending part way back up to the surface of the first member, the outer margin of the said entrance terminating below the surface of the first member an amount equal to the thickness of the horizontal portion of the first and second members, the inner portion of the said entrance comprising a horizontally extending lip with a downwardly extending part thereon, and a projection with upper and lower surfaces on one edge of the horizontal portion of the second member mating with the said opening so that a part of the horizontal portion of the second member overlies the said outer margin, the said projection having a similar curvature to said opening such that said upper surface of said projection when fully inserted into said opening contacts the surface of said opening along a longitudinally extending area on the said lip and the said lower surface can contact the surface of said opening only along a longitudinally extending area adjacent said outer margin.

References Cited by the Examiner
UNITED STATES PATENTS

| 3,029,052 | 4/62 | Early et al. | 189—34 |
| 3,043,407 | 7/62 | Marryatt | 94—30 X |
| 3,100,556 | 4/63 | De Ridder | 189—34 |

RICHARD W. COOKE, Jr., *Primary Examiner.*

BENJAMIN BENDETT, *Examiner.*